Oct. 21, 1924.
J. L. SHRODE
AUTOMATIC EXPANSION VALVE
Filed June 19, 1923
1,512,243
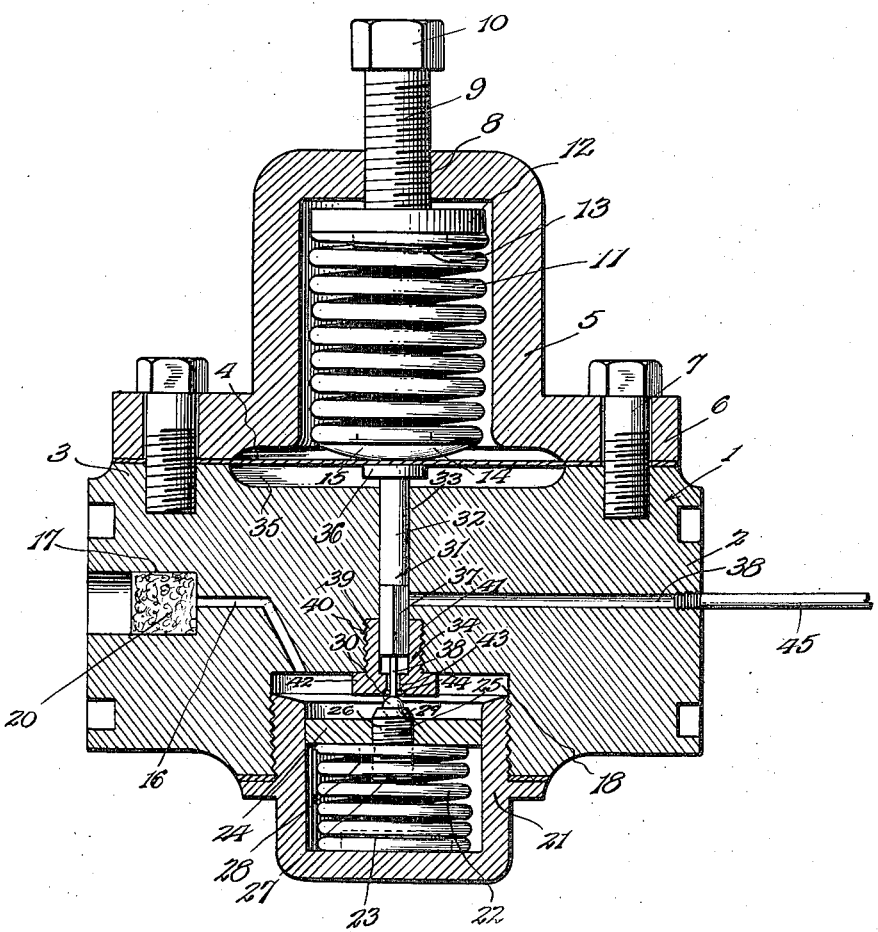
Inventor
J. L. Shrode.
By Lacey & Lacey, Attorneys Patented Oct. 21, 1924.

1,512,243

UNITED STATES PATENT OFFICE.

JOHN L. SHRODE, OF DALLAS, TEXAS.

AUTOMATIC EXPANSION VALVE.

Application filed June 19, 1923. Serial No. 646,419.

*To all whom it may concern:*

Be it known that I, JOHN L. SHRODE, a citizen of the United States, residing at Dallas, in the county of Dallas and State of Texas, have invented certain new and useful Improvements in Automatic Expansion Valves, of which the following is a specification.

This invention relates to improvements in expansion valves such as are employed in refrigerating systems in effecting expansion of the liquid refrigerant under high pressure to gaseous form at a comparatively low pressure.

Such valves as ordinarily constructed present various disadvantages. In most types of such valves the parts are so constructed and arranged that, due to expansion of the liquid refrigerant within the valve proper, the lubricant is congealed and when this occurs it is necessary to thoroughly clean the valve before the system can again be set in operation. Furthermore, in valves of this type where the construction and arrangement of parts is such as to permit of expansion of the liquid refrigerant within the valve itself, the casing of the valve is cooled to such a low temperature that atmospheric moisture will be condensed and congealed upon the exterior of the valve casing forming a frosty coating which causes a drip when the system is shut down and the casing is brought to atmospheric temperature. In the view of the foregoing the present invention has as one of its most important objects to provide an expansion valve so constructed that there will be no appreciable expansion of the liquid refrigerant in its passage through the valve so that none of the disadvantages outlined above will attend the operation of the valve, thereby avoiding the necessity of repeatedly cleaning the valve of congealed lubricant, obviating dripping of water from the exterior of the valve casing when the system has been shut down, and obviating freezing of moisture in the valve casing above the diaphragm which would cause sticking of the valve.

Another object of the invention is to provide a valve so constructed that not only will expansion of the refrigerant within the valve be obviated, but furthermore such expansion may be effected at any desired distance from the valve.

Another object of the invention is to so construct the valve that the high velocity of the refrigerant at the point of expansion takes place outside the valve body, thereby eliminating the cutting and scoring action of the valve seats, that require replacement of the seats or the valve.

The figure of the drawing is a diametric sectional view through the valve embodying the invention.

In the drawing, the casing of the valve is indicated in general by the numeral 1 and the same comprises a body 2 which is of substantially solid structure and is provided with a boss 3 at its top of annular form and having a flat upper surface upon which is disposed the peripheral portion of a diaphragm 4. A bonnet 5 is disposed upon the top of the valve body 2 and is provided at its base with a peripheral outstanding flange 6 which bears upon the peripheral portion of the diaphragm 4, stud bolts 7 being fitted through the flange and diaphragm and threaded into the body 2. The dome of the bonnet 5 is provided in its top with a threaded opening 8 into which is adjustably threaded an adjusting screw 9 having a polygonal head 10 for the application of a wrench or other tool whereby it may be rotatably adjusted. Housed within the bonnet 5 is a compression spring 11 upon the upper end of which is fitted a bearing head 12 against the upper face of which head the lower end of the adjusting screw 9 bears, the head 12 being preferably provided upon its under side with a boss 13 seating within the upper helix of the spring to maintain the head in concentric relation to the said spring. A similar head 14 is applied to the lower end of the spring and has its under side of convex form as indicated by the numeral 15, this head bearing upon the central portion of the diaphragm 4.

The valve body 2 is formed with an inlet duct which is indicated by the numeral 16 and which at its intake end communicates with an enlargement thereof indicated by the numeral 17 of considerably greater diameter than the duct itself. The discharge end of the duct opens through the top of a cylindrical recess or bore 18 which is formed in the body 2 and opens through the under side thereof. Liquid refrigerant is supplied to the valve through the inlet duct 16, and a packing 20 of steel wool or fine mesh wire which acts as a filter for the said refrigerant. A chambered closure plug 21 is threaded into the recess or bore 18 and serves to close the same, and a compression spring 22 is arranged within the chamber of the plug and fits at its lower end about a boss 23 formed upon the upper side of the bottom of said chamber. The upper end of the spring bears against the under side of a disc 24 which snugly slidably fits within the chamber of the plug 21, and a valve ring 25 comprising a threaded plug 26, is adjustably fitted axially through the said disc 24, the plug at its lower end being provided with a transverse groove 27 for the application of a screw driver whereby it may be adjusted or removed, and a lock nut 28 being threaded onto the plug and bearing against the under side of the disc 24 to secure the plug in its positions of adjustment. The plug at its upper end is provided with a semi-spherical seat 29 for the spherical head 30 of the valve proper which is indicated in general by the numeral 31. The valve 31 comprises a stem 32, the upper portion of which is of cylindrical contour and fits loosely and slidably in a pore 33 which is in axial alinement with the bore 18 and opens into the same through a removable valve seat indicated in general by the numeral 34 and which seat will presently be more fully described. The upper end of the valve stem 32 projects into a shallow recess formed in the upper side of the valve body 2 beneath the diaphragm 4, which chamber is indicated by the numeral 35, and a circular head 36 is provided upon the said upper end of the valve stem within the chamber and bears against the under side of the said diaphragm 4 at the center thereof and consequently at a point opposite the point of bearing engagement of the head 14 with the said diaphragm. The intermediate portion of the valve stem 32 is preferably of polygonal form as indicated by the numeral 37 and, in the movement of the stem, operates past the intake end of an outlet duct 38 which is formed in the valve body 2 substantially in horizontal alinement with the inlet duct 16. The lower portion of the valve stem 32 is considerably reduced in diameter as indicated by the numeral 38, and is connected with and supports the spherical valve head 30.

The valve seat 34 comprises a cylindrical body 39 which is exteriorly threaded as at 40 and removably fitted into a socket 41 formed in the valve body 2 and opening through the top wall of the bore 18, the said body 39 being provided with a polygonal head 42 whereby it may be engaged with a suitable tool for the purpose of removal. The head 42 is formed axially with an orifice 43 and at the lower end of the orifice with a valve seat 44 with which the valve 30 coacts in a manner to be presently explained.

A pipe 45 is fitted at the outlet end of the discharge duct 38 and leads to any point where it is desired the liquid refrigerant shall be permitted to expand.

The valve is automatic in its operation and in adjusting the valve to permit flow of the liquid refrigerant through the valve to the pipe 45 and thence to the point where the refrigerant is to be permitted to expand, the screw 9 is adjusted so as to suitably tension the spring 11 which will exert pressure upon the diaphragm 4 and valve stem 32 to move the head of the valve 30 away from the seat 44. The liquid refrigerant will then flow through the filtering filling 20 into the inlet duct 16, through the passage 43 past the valve, and through the duct 38 to the pipe 45, the fluid passing the polygonal portion 37 of the valve stem. The refrigerant will also exert pressure against the diaphragm 4, the fit of the stem 32 in the bore 33 being sufficiently loose to permit of the by-pass of a sufficient volume of the refrigerant for this purpose. When the pressure against the under side of the diaphragm 4 becomes greater than that exerted by the spring 11, the spring 22 will act to force the spherical head 30 of the valve to its seat 44 thus cutting off the supply of refrigerant until such time as the suction of the pump of the system has reduced the pressure on the lower face of the diaphragm to a degree less than that exerted by the spring 11 whereupon the said spring will act to again open the valve and permit the refrigerant to flow as before. This automatic operation of the valve will continue so long as the system is in operation and it will be evident from the foregoing and by reference to the drawings that there is no appreciable expansion of the liquid refrigerant within the valve and that expansion is permitted only at a point more or less removed from the valve.

It will be understood that in the event repairs become necessary to the valve parts, it is only required to remove the closure plug 21 whereupon access may be had to the valve seat 34, the valve 31, and the valve rest 25.

Having thus described the invention, what is claimed as new is:

1. An expansion valve of the type mentioned comprising a casing having a restricted valve chamber and an inlet duct communicating therewith, a valve seat in the chamber having a bore and arranged at one side of the inlet duct, a valve for coaction with the said seat and closing in the direction of flow from the inlet duct, the casing having an outlet in direct communication with the bore of the valve seat above the seat, the inlet and outlet and the bore of the valve seat being of restricted area whereby to prevent expansion of a liquid refrigerant in its passage through the valve.

2. An expansion valve of the type mentioned comprising a casing having a restricted valve chamber and an inlet duct communicating therewith, a valve seat in the chamber having a bore and arranged at one side of the inlet duct, the casing having a passage therethrough alined with said bore, and a valve for coaction with the said seat and including a stem slidable in the bore and formed to provide for passage of liquid refrigerant past the valve and seat and through the bore and the alined passage in the casing, the casing having an outlet in direct lateral communication with said passage, the inlet and outlet and the bore of the valve seat being of restricted area whereby to prevent expansion of a liquid refrigerant in its passage through the valve.

3. An expansion valve of the type mentioned comprising a casing having upper and lower chambers and a bore establishing communication between the same, a diaphragm in the upper chamber, a valve stem slidable in the bore and at its upper end engaging the said diaphragm, the upper chamber being closed except at said bore, means above the diaphragm bearing yieldably upon the same to transmit pressure to the said valve stem in a direction to effect opening of the valve, a valve seat in the lower chamber, a valve head carried by the lower end of the stem for coaction with the seat, and means yieldably resisting movement of the valve to open position, the casing having an inlet communicating with its lower chamber at one side of the valve seat, and an outlet having direct lateral communication with its bore at the other side of the valve seat.

4. An expansion valve of the type mentioned comprising a casing having upper and lower chambers and a bore establishing communication between the same, the upper chamber being closed except at the bore, a diaphragm in the upper chamber, a valve stem slidable in the said bore and at its upper end engaging the said diaphragm, means above the diaphragm bearing yieldably upon the same to exert opening pressure upon the valve stem in the direction of its length, a valve seat in the lower chamber of the casing, a valve head upon the lower end of the said stem for coaction with the said valve seat, and means yieldably resisting downward movement of the valve away from the seat and opposing the first mentioned valve urging means, the casing being provided with an inlet in communication with the lower chamber at one side of the valve seat and with an outlet in direct communication with the bore.

5. An expansion valve of the type mentioned comprising a casing having upper and lower chambers and a bore establishing communication between the same, a diaphragm in the upper chamber, a valve stem slidable in the said bore and at its upper end engaging the said diaphragm, the stem fitting the bore in a manner to provide for restricted passage of liquid refrigerant from the lower chamber through the bore and into the upper chamber below the diaphragm, a valve seat in the lower chamber of the casing, a valve head upon the lower end of the said stem for coaction with the said valve seat, a spring within the upper chamber bearing upon the said diaphragm to exert pressure thereon and in turn exert pressure upon the valve stem in the direction of its length to unseat the valve, means mounted in the top of the casing for varying the tension of said spring, and means in the bottom of the casing yieldably resisting downward movement of the valve away from the seat and opposing the first mentioned valve urging means, the casing being provided with an inlet in communication with the lower chamber at one side of the valve seat and with an outlet in direct communication with the bore.

6. An expansion valve of the type mentioned comprising a casing having upper and lower chambers and a bore establishing communication between the same, the upper chamber being closed except at the bore, an integral closed boss on the top of the casing, a diaphragm in the upper chamber, a valve stem slidable in the said bore and at its upper end engaging the said diaphragm, a spring within the boss above the diaphragm, a head upon which the lower end of the spring bears and having a convex under side, the central portion of which bears upon the diaphragm at a point substantially in alinement with the axis of the valve stem, an adjusting screw mounted in the top of the boss, a head resting upon the upper end of the spring and upon which the screw bears whereby the tension of the spring may be varied to vary the force exerted by the spring upon the valve stem through the medium of the diaphragm, a valve seat in the lower chamber of the casing, a valve head upon the lower end of the said stem for coaction with the said valve seat, and means yieldably resisting downward movement of the valve away from the seat and opposing the first mentioned valve urging means, the casing being provided with an inlet in communication with the lower chamber at one side of the valve seat and with an outlet in direct communication with the bore above the valve seat.

7. An expansion valve of the type mentioned comprising a casing having upper and lower chambers and a bore establishing communication between the same, a diaphragm in the upper chamber, a valve stem slidable in the said bore and at its upper end engaging the said diaphragm, means above the diaphragm bearing yieldably upon the same to exert opening pressure upon the valve stem in the direction of its length, a valve seat removably fitted in the top of the lower chamber of the casing at the lower end of the bore, a valve head upon the lower end of the said stem for coaction with the said valve seat, and a yieldably supported rest in the lower chamber for the said valve head free of the valve head and opposing the pressure exerted by the first mentioned valve urging means, the casing being provided with an inlet in communication with the lower chamber at one side of the valve seat and with an outlet in direct communication with the bore.

8. An expansion valve of the type mentioned comprising a casing having upper and lower chambers and a bore establishing communication between the same, a diaphragm in the upper chamber, a valve stem slidable in the said bore and at its upper end engaging the said diaphragm, means above the diaphragm bearing yieldably upon the same to exert pressure upon the valve stem in the direction of its length, a valve seat in the lower chamber of the casing, a valve head upon the lower end of the said stem for coaction with the said valve seat, a disc arranged within the lower chamber, a spring disposed within the chamber and bearing upwardly against the disc, and a rest for the valve head adjustably fitted through the said disc, the casing being provided with an inlet in communication with the lower chamber and with an outlet in communication with the bore.

In testimony whereof I affix my signature.

JOHN L. SHRODE. [L. S.]